(12) United States Patent
Tandra et al.

(10) Patent No.: US 11,848,792 B2
(45) Date of Patent: Dec. 19, 2023

(54) FACILITATING EFFICIENT MEETING MANAGEMENT

(71) Applicant: MICROSOFT TECHNOLOGY LICENSING, LLC, Redmond, WA (US)

(72) Inventors: Pranavasthitha Tandra, Bangalore (IN); Hitesh Kumar Jhamb, Rajasthan (IN); Vikram Gupta, Moradabad (IN); Arvind Kumar Singh, Bengaluru (IN); Anubhuti Arun, Uttar Pradesh (IN); Ashutosh Tripathi, Uttar Pradesh (IN); Kausik Ghatak, Bengaluru (IN); Aman Rastogi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/657,697

(22) Filed: Apr. 1, 2022

(65) Prior Publication Data

US 2023/0006849 A1 Jan. 5, 2023

(30) Foreign Application Priority Data

Jun. 30, 2021 (IN) .............................. 202141029377

(51) Int. Cl.
*H04L 12/18* (2006.01)
(52) U.S. Cl.
CPC ...... *H04L 12/1827* (2013.01); *H04L 12/1822* (2013.01); *H04L 12/1831* (2013.01)

(58) Field of Classification Search
None
See application file for complete search history.

(56) References Cited

U.S. PATENT DOCUMENTS

| 10,389,974 B2 | 8/2019 | Astavans et al. |
| 10,547,654 B2 | 1/2020 | Faulkner |

(Continued)

OTHER PUBLICATIONS

"Cluster and Rank Tweets", Retrieved from: https://github.com/nitsanluke/tweet_clustering_ranking, Sep. 22, 2017, 3 Pages.

(Continued)

*Primary Examiner* — Mohamed A. Wasel
*Assistant Examiner* — Gregory P Tolchinsky
(74) *Attorney, Agent, or Firm* — SHOOK, HARDY & BACON L.L.P.

(57) ABSTRACT

Methods, computer systems, and computer-storage media, and graphical user interfaces are provided for facilitating efficient meeting management, according to embodiments of the present technology. In one embodiment, engagement data associated with an attendee of an online meeting is obtained. Thereafter, an engagement metric is generated using the engagement data, the engagement metric indicating an extent of engagement of the attendee to the online meeting. Based on the engagement metric indicating that the extent of engagement of the attendee to the online meeting falls below an engagement threshold, a request is provided to disconnect or throttle an audio and/or video stream of the online meeting to and/or from an attendee device associated with the attendee of the online meeting. Efficient meeting management may also be performed by clustering related messages.

20 Claims, 11 Drawing Sheets

(56) References Cited

U.S. PATENT DOCUMENTS

| | | | |
|---|---|---|---|
| 10,757,367 | B1 | 8/2020 | Peters et al. |
| 11,405,589 | B1* | 8/2022 | Tran .................. H04L 12/1827 |
| 11,575,531 | B2* | 2/2023 | Stevens ................ H04M 3/569 |
| 2013/0204535 | A1 | 8/2013 | Kapoor et al. |
| 2014/0362165 | A1 | 12/2014 | Fleszar et al. |
| 2015/0154291 | A1 | 6/2015 | Shepherd et al. |
| 2019/0349212 | A1* | 11/2019 | Heins .................. H04L 12/1831 |
| 2021/0185276 | A1 | 6/2021 | Peters et al. |

OTHER PUBLICATIONS

Beebe, Nicole L., "Search Indexes For Text Evidence Relevantly", In 4th Annual Open Source Digital Forensics Conference, Oct. 16, 2013, 34 Pages.

Handley, et al., "SDP: Session Description Protocol", Retrieved from: https://www.rfc-editor.org/rfc/pdfrfc/rfc4566_txt.pdf, Jul. 2006, 49 Pages.

Koch, Korbinian, "A Friendly Introduction to Text Clustering", Retrieved from: https://towardsdatascience.com/a-friendly-introduction-to-text-clustering-fa996bcefd04, Mar. 26, 2020, 19 Pages.

Rosenberg, et al., "SIP: Session Initiation Protocol", Retrieved from: https://www.rfc-editor.org/rfc/pdfrfc/rfc3261.txt.pdf, Jun. 2002, 269 Pages.

Schulzrinne, et al., "RTP: A Transport Protocol for Real-Time Applications", Retrieved from: https://www.rfc-editor.org/rfc/rfc3550.pdf, Jul. 2003, 89 Pages.

Smith, et al., "IT Admin Guide to Education Insights in Microsoft Teams", Retrieved from: https://docs.microsoft.com/en-us/MicrosoftTeams/class-insights, Apr. 28, 2022, 20 Pages.

Smith, Brad, "Microsoft will be Carbon Negative by 2030", Retrieved from: https://blogs.microsoft.com/blog/2020/01/16/microsoft-will-be-carbon-negative by-2030/, Jan. 16, 2020, 16 Pages.

"International Search Report and Written Opinion Issued in PCT Patent Application No. PCT/US22/031680", dated Sep. 14, 2022, 12 Pages.

* cited by examiner

Class Analytics – 28 July 2020 ─304

Words that spiked interest

Technetium  Atomic Number
  Nobel Prize   Organic Compounds
Mendeleev      Liquid Metal
        Gallium
  Ionic Reactions    Periodic Table

Class Activity Distribution ─306

- Lecture
- Interaction (Qna)
- Homework review

39% / 40% / 21%

Students Dropped (5)

| | Time |
|---|---|
| Jane D'souza | Never Joined |
| Mac Buxton | Never Joined |
| Aadi Kapoor | 9:12 AM |
| Niharika Khanna | 9:28 AM |
| Alvin Tao | 9:34 AM |

Export ─308      Close

Class Feedback

| | |
|---|---|
| Overall satisfaction | 3.8/5 |
| Course content was easy to understand | 3.7/5 |
| Instructor was well-prepared | 3.9/5 |
| Instructor was receptive to questions | 4.1/5 |
| Instructor was receptive to teachers' questions | 4.2/5 |

Engagement Index: 7.2/10 ─302

FACILITATING EFFICIENT MEETING MANAGEMENT

CROSS-REFERENCE TO RELATED APPLICATIONS

This application claims priority to Indian Patent Application No.: 202141029377, filed Jun. 30, 2021, the entire contents of which is hereby incorporated by reference in its entirety.

BACKGROUND

While moderating or presenting at an online meeting, a moderator may wish to manage the meeting to be most valuable to attendees. For example, a moderator may wish to understand attendee engagement and attendee questions associated with the online meeting so that the moderator can adjust content presentation as needed. Recognizing attendee engagement and topics of importance, however, can be difficult for a moderator that is presenting content. In addition to the difficulties and time consumption associated with a moderator effectively managing an online meeting, unnecessary computing and network resources are often consumed. For example, in some cases, an attendee may be disengaged from an online meeting (e.g., no longer present for the meeting, interacting with other systems, devices, or applications, etc.). In such a case, the attendee device may be consuming unnecessary resources to present the online meeting on the attendee device and/or to capture a video of the attendee. As another example, in cases that a presentation is being presented during an online meeting, which is not an interactive session, the attendee device may be consuming unnecessary resources to capture a video of the attendee. In addition, network resources (e.g., bandwidth) to transfer the audio and/or video streams over the network may be unnecessarily consumed. As another example, assume a number of messages, such as questions or comments, are input into the chat box during the online meeting. In addition to the time required by a moderator to review the messages, computing resources are used to process multiple scroll inputs and/or multiple screen rendering updates.

SUMMARY

Various aspects of the technology described herein are generally directed to systems, methods, and computer storage media for, among other things, facilitating efficient online meeting management based on attendee engagement and message input. Advantageously, efficiencies of computing resources and moderator efforts can be enhanced using implementations described herein. In particular, in some embodiments, in accordance with an identified attendee engagement, computing resources can be preserved. For example, in cases in which an attendee is identified as disengaged, the attendee's video and/or audio connection may be terminated (or prompted for termination) or throttled to reduce unnecessary utilization of video and/or audio. By disconnecting or throttling an attendee's video and/or audio stream, utilization of computing resources of the attendee device is reduced as well as utilization of network resources communicating such video and/or audio streams.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 3 provides an example graphical user interface for presenting engagement metrics associated with an online meeting, in accordance with aspects of the technology described herein;

DETAILED DESCRIPTION

Figure 1:
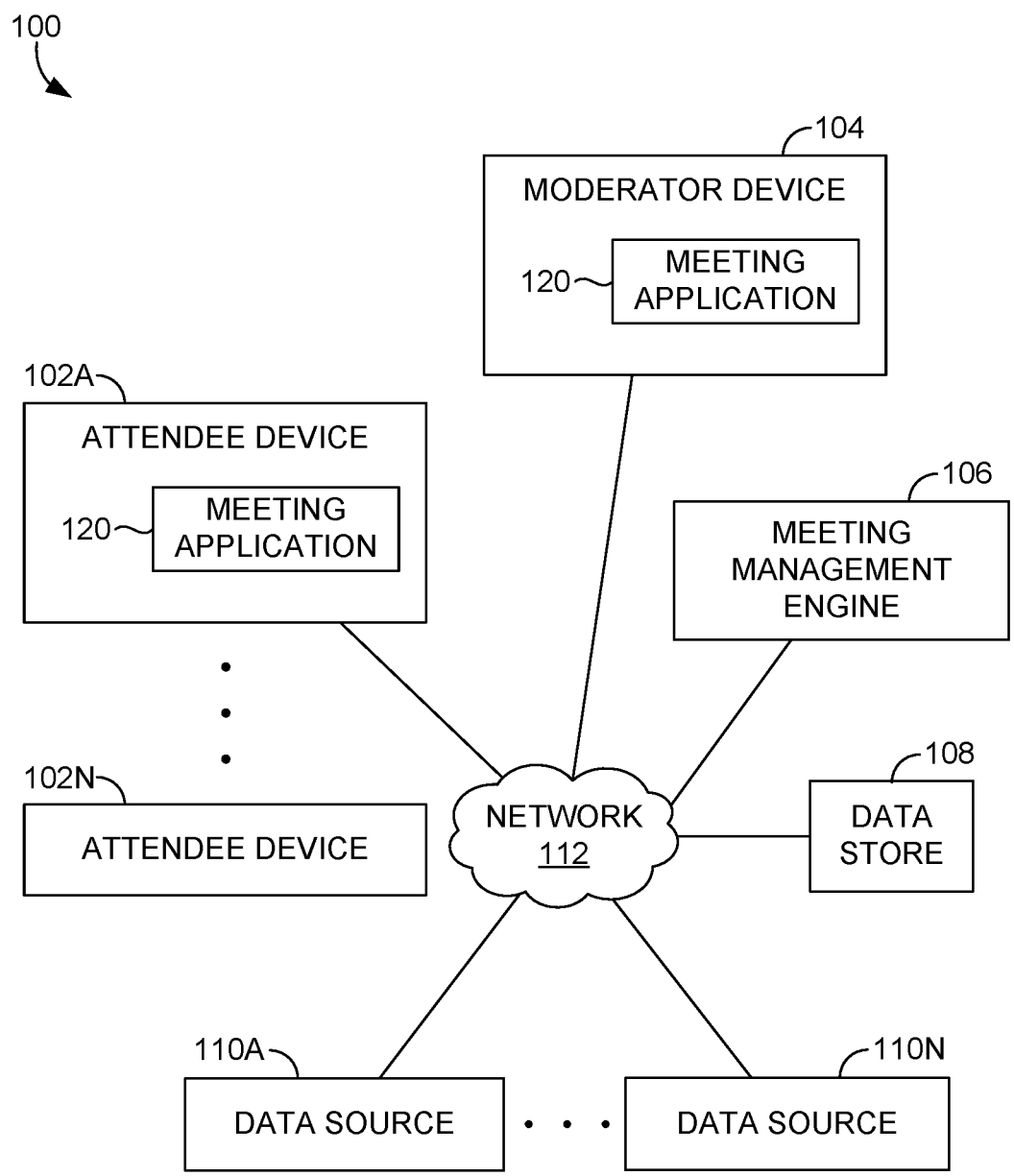
FIG. 1 is a block diagram of an exemplary system for facilitating meeting management, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Meeting management systems operate to provide teleconferencing, telecommuting, distance education, and social relations services. In particular, meeting management systems generally perform computing tasks to facilitate meetings among various individual or groups. For example, meeting management systems support scheduling, attendance tracking, user session mediation, and recording and distributing meeting content (e.g., audio and visual content, transcriptions of same, presentation materials). With the advancements of meeting management systems, a moderator, or presenter, may more often lead or conduct an online meeting (e.g., a class presentation). While moderating or presenting at an online meeting, a moderator may wish to manage the meeting to be most valuable to attendees. For example, a moderator may wish to understand attendee engagement of the online meeting so that the moderator can adjust content presentation as needed. For instance, in cases in which an attendee or set of attendees is disengaged from the online meeting, a moderator may desire to ask questions or otherwise engage the attendee(s). As another example, a moderator may wish to identify questions or comments that are more relevant or important to the attendees. Recognizing attendee engagement and topics of importance, however, can be difficult for a moderator that is presenting content. Recognition of attendee engagement is further complicated when attendees are not visible over video. Further, recognition of relevant or important topics can be difficult for a moderator, particularly when numerous questions or comments are input into a chat box during the meeting.

In addition to the difficulties and time consumption associated with a moderator effectively managing an online meeting, unnecessary computing and network resources are often consumed. For example, in some cases, an attendee may be disengaged from an online meeting (e.g., no longer present for the meeting, interacting with other systems, devices, or applications, etc.). In such a case, the attendee device may be consuming unnecessary resources to present the online meeting on the attendee device and/or to capture a video of the attendee. As another example, in cases that a presentation is being presented during an online meeting, which is not an interactive session, the attendee device may be consuming unnecessary resources to capture a video of the attendee. In addition, network resources (e.g., bandwidth) to transfer the audio and/or video streams over the network may be unnecessarily consumed. As another example, assume a number of messages, such as questions or comments, are input into the chat box during the online meeting. In addition to the time required by a moderator to review the messages, computing resources are used to process multiple scroll inputs and/or multiple screen rendering updates.

Accordingly, embodiments described herein are directed to facilitating efficient online meeting management, among other things, based on attendee engagement and message input. Advantageously, efficiencies of computing resources and moderator efforts can be enhanced using implementations described herein. In particular, in some embodiments, in accordance with an identified attendee engagement, computing resources can be preserved. For example, in cases in which an attendee is identified as disengaged, the attendee's video and/or audio connection may be terminated (or prompted for termination) or throttled to reduce unnecessary utilization of video and/or audio. By disconnecting or throttling an attendee's video and/or audio stream, utilization of computing resources of the attendee device is reduced as well as utilization of network resources communicating such video and/or audio streams.

In other embodiments, computing resources are preserved in accordance with identifying similar or relevant messages. In particular, messages identified as similar can be clustered to aggregate the messages. The clustered messages, or a representation thereof (e.g., a selected message of the cluster or a newly generated message to represent the cluster), can be presented to a moderator, for example, in a sorted or ranked order (e.g., based on number of messages for the cluster). In this regard, similar messages can be clustered, thereby reducing computing resources that may otherwise be used to process multiple scroll inputs to view all the messages and/or multiple screen rendering updates.

In operation, to facilitate meeting management in a resource efficient manner, embodiments herein include an engagement manager to manage attendee engagement and a message manager to manage messages input by attendees. In managing attendee engagement, engagement metrics may be determined for attendees, individually and/or as a group. Such engagement metrics generally indicate an extent of engagement for a particular attendee or for a set of attendees. As described herein, various types of engagement data may be used to determine engagement metrics. By way of example only, emotion data indicating emotion of an attendee(s), distraction data indicating a level of distraction of an attendee, interaction data indicating a level of interaction with the meeting, connection data indicating a level of signal connection strength, influx/outflux data indicating number or movement of individuals in the camera view, and/or the like may be used to identify engagement metrics. Based on the engagement metric, an action may be taken to enhance attendee engagement and/or conserve computing and/or network resources. For example, prompts or notifications can be provided to the moderator to alert the moderator as to engagement levels or provide suggestions for improving engagement levels. As another example, video and/or audio streams may be disconnected, or requested or suggested for disconnection, to conserve resources.

In managing messages for a meeting, messages may be collected and clustered based on similarity of message content relative to one another. The clustered messages may be scored and/or ranked, for example, to indicate a frequency value of similar messages. The clustered messages, or representations thereof, can then be presented to the moderator to facilitate efficiency of reviewing messages input by attendees that the moderator may desire to address. Various implementations are described herein, and the examples provided herein are not intended to be limiting.

Overview of Exemplary Environments for Facilitating Meeting Management Based on Attendee Engagement and Message Input Referring initially to FIG. 1, a block diagram of an exemplary network environment 100 suitable for use in implementing embodiments of the invention is shown. Generally, the system 100 illustrates an environment suitable for facilitating efficient online meeting management, among other things, based on attendee engagement and message input. The network environment 100 includes attendee devices 102A-102N (generally referred to herein as attendee device(s) 102), a moderator device 104, a meeting management engine 106, a data store 108, and data sources 110A-110N (referred to generally as data source(s) 110). The attendee device 102, the moderator device 104, the meeting management engine 106, the data store 108, and the data sources 110 can communicate through a network 112, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the technology disclosed throughout this document. Neither should the exemplary network environment 100 be interpreted as having any dependency or requirement related to any single component or combination of components illustrated therein. For example, the attendee device 102, the moderator device 104, and the data sources 110 may be in communication with the meeting management engine 106 via a mobile network or the Internet, and the meeting management engine 106 may be in communication with data store 108 via a local area network. Further, although the environment 100 is illustrated with a network, one or more of the components may directly communicate with one another, for example, via HDMI (high-definition multimedia interface), DVI (digital visual interface), etc. Alternatively, one or more components may be integrated with one another, for example, at least a portion of the meeting management engine 106 and/or data store 108 may be integrated with the attendee device 102 or moderator device 104. For instance, a portion of the meeting management engine 106 configured to manage online meetings may be performed via an attendee device and/or a moderator device, while another portion may be performed via a server in communication with such devices.

The attendee devices 102 and moderator device 104 can be any kind of computing device capable of participating in online meetings. For example, in an embodiment, the attendee devices 102 and moderator device 104 can be a computing device such as computing device 1100, as described above with reference to FIG. 11. In embodiments, the devices can be a personal computer (PC), a laptop computer, a workstation, a mobile computing device, a PDA, a cell phone, or the like.

The attendee devices 102 and moderator device 104 can include one or more processors, and one or more computer-readable media. The computer-readable media may include computer-readable instructions executable by the one or more processors. The instructions may be embodied by one or more applications, such as meeting application 120 shown in FIG. 1. The meeting application(s) may generally be any application capable of facilitating online meetings. In some implementations, the meeting application 120 comprises a web application, which can run in a web browser, and could be hosted at least partially server-side. In addition, or instead, the meeting application 120 can comprise a dedicated application. In some cases, the application is integrated into the operating system (e.g., as a service).

In embodiments, content may be presented via a meeting application 120 operating on the attendee device 102 and/or moderator device 104. In this regard, the attendee device 102 and/or moderator device 104, via meeting application 120, might be used to present, view, and/or hear content. Content may refer to any type of audio content and/or electronic content, such as a document, an image, a video, a live video, a slide deck, a file, online/web content, or the like. As such, a meeting application 120 may be used to present such various content. For example, MICROSOFT TEAMS may be a meeting application 120 to present content. The meeting application 120 can include any type of application that facilitates online meetings. Further, the meeting application 120 can obtain content in any manner, such as via data source 110. In this way, data source 110 may communicate or provide content to the attendee device 102 and/or moderator device 104 (e.g., via network 112). As described, a meeting application may be a stand-alone application, a mobile application, a web application, or the like. In some cases, the functionality described herein may be integrated directly with an application or may be an add-on, or plug-in, to an application.

Meeting application 120 generally enables communication between computing devices (e.g., attendee device 102 and moderator device 104). In embodiments, video and/or audio communications may occur over a network. Accordingly, meeting attendees may communicate with one another over video and/or audio technologies. Such communications may provide videos including individuals or other content (e.g., documents via desktop sharing). In this regard, meeting application 120 may operate to obtain data via one or more sensors, such as microphones, cameras, etc. that may reside within the attendee and/or moderator device or operate remote such devices.

Meeting application 120 may operate on both the attending devices and the moderator device. The attendee devices 102 generally represent devices accessed or operated by attendees of an online meeting. An attendee may join the online meeting via audio and/or video. The moderator device 104 generally represents a device accessed or operated by a moderator of the online meeting. As can be appreciated, the moderator may be a presenter of the meeting or another individual moderating or managing the meeting. For example, a moderator of the meeting may be a class instructor of an online class being conducted via the meeting application 120. As another example, a moderator may be a presenter or initiator of the meeting being conducted via meeting application 120. In some cases, the moderator may be a host, or individual that initiates or establishes an online meeting, but need not be the case. As described herein, using various implementations, the moderator may be presented with information that is different from that presented to other meeting attendees. For example, a moderator may be presented with engagement metrics and/or message metrics, as described more fully herein. In embodiments, engagement metrics and/or message metrics may be shared with an organization (e.g., an entire organization) for better visibility of effectiveness of the moderator or presentation materials, such as course materials.

Attendee device 102 and moderator device 104 can be client devices on a client-side of operating environment 100, while meeting management engine 106 can be on a server-side of operating environment 100. Meeting management engine 106 may comprise server-side software designed to work in conjunction with client-side software on attendee and/or moderator device so as to implement any combination of the features and functionalities discussed in the present disclosure. An example of such client-side software is meeting application 120. This division of operating environment 100 is provided to illustrate one example of a suitable environment, and it is noted that there is no requirement that meeting management engine 106, attendee device 102, and moderator device 104 remain as separate entities. For clarity of explanation, we will describe embodiments in which the attendee device 102, the moderator device 104, the meeting management engine 106, the data store 108, and the data sources 110 are separate, while understanding that this may not be the case in various configurations contemplated within the present technology.

The attendee device 102 and moderator device 104 can communicate with the meeting management engine 106 to facilitate the online meeting and meeting management. In embodiments, for example, an attendee utilizes the attendee device 102 and a moderator utilizes the moderator device 102 to facilitate meeting management via the network 112. For instance, in some embodiments, the network 112 might be the Internet, and the attendee device 102 and moderator device 104 interact with the meeting management engine 112 to obtain and/or provide information. In other embodiments, for example, the network 112 might be an enterprise network associated with an organization. It should be apparent to those having skill in the relevant arts that any number of other implementation scenarios may be possible as well.

The meeting management engine 106 is generally configured to facilitate online meetings management, among other things, based on attendee engagement and message input. In particular, the meeting management engine 106 can obtain engagement data and message data, for example, from various attendee devices 102. The meeting management engine 106 can then use such data to determine an engagement metric(s) and/or message metric(s). An engagement metric generally refers to any metric that indicates engagement of an attendee or a set of attendees (e.g., all attendees). A message metric generally refers to any metric pertaining to a message input by an attendee (e.g., via a chat box). Message input may be any input from an attendee that indicates a message. Message input may be an audio input or a text input, for example, in the form of an instant message or text message. Message input may also include reactions, such as "like," interacting with an emoji, etc. (which can be treated in a different stream).

Based on the attendee engagement metric and/or the message metric, the meeting management engine 106 can initiate an appropriate action in association with the corresponding metric. As one example, assume an attendee engagement metric indicates overall attendee engagement in association with a meeting. In such a case, the meeting management engine may communicate with the moderator device to provide a notification of the overall attendee engagement. As another example, assume an attendee engagement metric indicates attendee engagement associated with various attendees of a meeting. In such a case, the meeting management engine may identify attendees lacking a certain amount of engagement and, thereafter, initiate a disconnection of the video feed associated with attendees lacking engagement to reduce resource utilization. As another example, a poor network quality of an attendee can result in a recommendation to automatically block video. As such, the meeting management engine may communicate with attendee devices and/or moderator devices, or other devices, to initiate an appropriate action in relation to determined metrics.

As described herein, to identify engagement metrics and/or message metrics, various types of engagement and/or message data may be used. In some cases, such data may be obtained from the attendee device 102 and/or moderator device 104. Additionally or alternatively, such data may be obtained from various data sources, such as data sources 110. Examples of data sources or services include a meeting application server that collects data, a video stream source, a facial detection system, an emotion detection system, a signal connection system, etc. Accordingly, such data sources 110 may provide data to the meeting management engine 106, or data store 108 associated therewith, for use by the meeting management engine 106 to manage meetings. Such data sources 110 are not intended to be limited in type or number.

The meeting management engine 106 and/or data sources 110, according to embodiments, can be implemented as server systems, program modules, virtual machines, components of a server or servers, networks, and the like. Various types of implementations that facilitate meeting management are within the scope of embodiments described herein.

Figure 2:
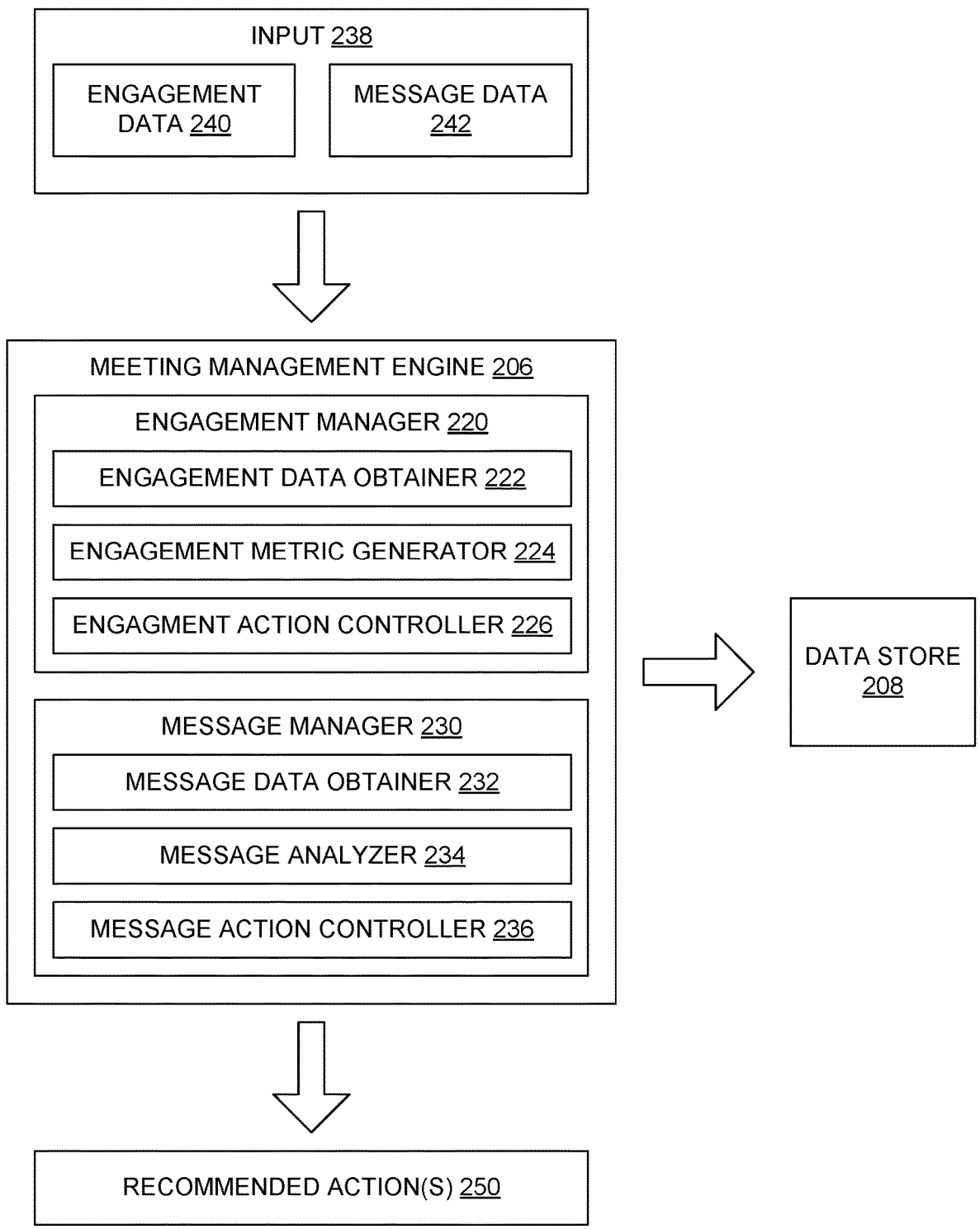
FIG. 2 is an example meeting management engine in accordance with aspects of the technology described herein.

Turning now to FIG. 2, FIG. 2 illustrates a meeting management engine 206. In embodiments, the meeting management engine 206 includes an engagement manager 220 and a message manager 230. According to embodiments described herein, the meeting management engine 206 can include any number of other components not illustrated. In some embodiments, one or more of the illustrated components 220 and 230 can be integrated into a single component or can be divided into a number of different components. Components 220 and 230 can be implemented on any number of machines and can be integrated, as desired, with any number of other functionalities or services. By way of example only, meeting manager 220 may operate at a server, while message manager 230, or aspects thereof, may operate at another server.

The meeting management engine 206 can communicate with the data store 208. The data store 208 is configured to store various types of information used by the meeting management engine 206. In embodiments, meeting management engine 206, an attendee device(s), a moderator device(s), and/or other devices or services provides data to the data store 208 for storage, which may be retrieved or referenced by the meeting management engine 206. Examples of types of information stored in data store 208 may include, for example, distraction data, interaction data, emotion data, connection data, influx/outflux data, machine learning models, message metrics, engagement metrics, heuristical models, and/or the like.

The engagement manager 220 is generally configured to manage engagement associated with meetings. In this regard, the engagement manager 220 can manage attendee engagement in association with a meeting to facilitate automated meeting management. As shown in FIG. 2, the engagement manager 220 may include an engagement data obtainer 222, an engagement metric generator 224, and an engagement action controller 226. According to embodiments, the engagement manager 220 can include any number of other components not illustrated. In some embodiments, one or more of the illustrated components 222, 224, and 226 can be integrated into a single component or can be divided into a number of different components. Components 222, 224, and 226 can be implemented on any number of machines and can be integrated, as desired, with any number of other functionalities or services.

The engagement data obtainer 220 can obtain (e.g., as input 238) engagement data 240 associated with a meeting for which automated meeting management is being performed. Engagement data generally refers to any type of data related to or associated with engagement of attendees of a meeting. By way of example only, engagement data may include distraction data, interaction data, emotion data, connection data, influx/outflux data, and/or the like.

Distraction data generally refers to data indicating or associated with attendee distraction. In this regard, distraction data may indicate an attendee is distracted from a meeting based on attendee focus or interaction with another device, application, window, etc. For example, distraction data may include an indication of prolonged interaction of another application(s) by an attendee. Such distraction data can be identified based on attendee interactions with another application, device, or window. Accordingly, attendee interaction logs may be used to identify interactions occurring during the time of the meeting. Distraction data may include an indication of an interaction and/or a time of an interaction with a device, application, or window different than that presenting the meeting. Stated differently, distraction data may include interactions with devices, applications, and/or windows external to the device, application, and/or window presenting the meeting to the attendee. Distraction data may be collected at another device (e.g., a server or service, attendee device), such as a data source 110 of FIG. 1, that can collect such data and provide the data to the meeting management engine, or otherwise enable access to such data.

Interaction data generally refers to data indicating or associated with interactions of an attendee with the meeting. In this way, interaction data may indicate an attendee is interacting or participating in connection with the meeting. An attendee may interact in any number of ways, including providing text input (e.g., via a messaging box), providing audio input, presenting content, presence in front of a camera, and/or the like. Interaction data may include an indication of an interaction and/or a time of an interaction. Such interaction data may be collected at another device (e.g., a data source 110 of FIG. 1) and, thereafter, provided to the meeting management engine 206. For example, interaction data may be collected at an attendee device (e.g., via various sensors or programs), or at a server associated with or providing the meeting, and provided to data store 208 accessible by the engagement data obtainer 222.

Emotion data generally refers to data indicating or associated with emotion(s) of an attendee of a meeting. In this regard, emotion data may indicate an emotion of an attendee during the meeting. An emotion may be any type of emotion, such as for example, happy, sad, surprised, confused, calm, angry, disgusted, etc. Emotion data may include an indication of an emotion and/or a time of an emotion. An emotion may be determined on a per frame basis or per a frame set basis. To this end, an attendee may have a single emotion associated with a meeting (e.g., as determined across a set of meeting frames) or various emotions (e.g., as determined for various single frames or subsets of frames). Such emotion data may be collected at another device and, thereafter, provided to the meeting management engine 206. For example, emotion data may be collected at the attendee device (e.g., via various sensors and a face detection algorithm that detects emotions), or at a server (e.g., via a face detection algorithm that detects emotions of attendees).

Connection data generally refers to data indicating a network connection associated with a meeting. In this way, connection data may indicate a signal strength of a meeting connection associated with an attendee device. Connection data may include an indication of a signal strength and/or a time of a signal strength. Such connection data may be collected at another device and, thereafter, provided to the meeting management engine. For example, connection data may be collected at the attendee device, via a network component, or at a server and, upon collection, provided to data store 208 accessible to the engagement manager 220.

Influx and/or outflux data generally refers to data indicating number of individuals moving and/or amounts of individuals movement in the camera view. For example, influx and outflux data can indicate a number of people moving out of the camera view and into the camera view when a camera associated with an attendee device is on.

Engagement data may also include historical data related to engagement. Such historical data may be provided from the data store 208. Historical data may be associated with an attendee, a meeting, a set of attendees, a set of meetings, etc.

As can be appreciated, engagement data associated with a meeting can be obtained by engagement data obtainer 222 in any number of ways. In this regard, engagement data may be received, retrieved, accessed, referenced, determined, identified, and/or the like. Such engagement data may be obtained via a data store, such as data store 208. Alternatively or additionally, engagement data may be obtained from remote services or devices (e.g., data sources 110 of FIG. 1). In some cases, engagement data is obtained as input, for example, from an attendee device or other device being used (e.g., computing device in meeting room). For example, a meeting application executing on an attendee device may be configured to collect various types of engagement data and provide the engagement data to the meeting management engine 206, or a data store associated therewith (e.g., data store 208). The attendee device, or portion thereof (e.g., application), may provide such data on a periodic basis, a continuous basis, or based on an occurrence of an event. Additionally or alternatively, a server (e.g., a server associated with meeting management engine or a server associated with another service) may collect engagement data and provide such data to the meeting management engine 206, or a data store associated therewith. For instance, user interaction logs may be captured at a remote server, and data therein may be provided to or accessible by the meeting management engine 206. As another example, emotion detection may be performed by a remote service and, such emotion data may be provided to the meeting management engine 206, or corresponding data store. As can be appreciated, in embodiments, the engagement data obtainer 222 may obtain engagement data associated with any number of attendees (e.g., all attendees) of a meeting.

Upon obtaining engagement data (e.g., by obtaining such data from a remote source or determining such data), the engagement metric generator 224 can generate engagement metrics associated with the meeting. An engagement metric generally refers to a measure, score, value, or other indication of extent or measure of engagement in connection with a meeting. In various implementations, an engagement metric(s) can be determined in relation to a set of attendees (e.g., all attendees) or in relation to a particular attendee.

One example of an engagement metric specific to a set of attendees is a meeting engagement metric. A meeting engagement metric indicates an extent, such as a percentage, that the attendees of the meeting are engaged in the meeting. One example of a meeting engagement metric includes a meeting engagement percent. A meeting engagement metric can be reflected as follows:

Engagement %=Σ($Wi$*Calm Emotion+$Wj$*Happy Emotion+$Wn$*Parameter $N$)/Σ(Attendee Count)

wherein Emotions Set=(Calm, Sad, Surprised, Confused, Happy, Angry, Disgusted)

In this regard, the engagement percent is generated based on a number of attendees associated with a calm emotion, a number of attendees associated with a happy emotion, etc. divided by the total number of attendees. The corresponding weights can be learned across different domain and context. As can be appreciated, a meeting engagement percent can be determined on a periodic basis (e.g., minute basis), for example, when emotions are determined for attendees on such a periodic basis. In other embodiments, a meeting engagement percent may represent an entire meeting, for example, when emotions are determined in association with the attendees for the entirety of the meeting.

With brief reference to FIG. 3, FIG. 3 illustrates an example graphical user interface 300 having a graphical display of a meeting engagement metric over the duration of the meeting. In FIG. 3, a graphical display 302 includes an engagement index that represents engagement percent over the duration of the meeting. In some cases, such a meeting engagement metric can be generated and presented in real time, such that a meeting moderator can view the meeting engagement metric during the meeting. In other cases, such a meeting engagement metric can be generated and presented at the conclusion of the meeting, at which point the moderator can view engagement metrics associated with the meeting.

As described, an engagement metric(s) can additionally or alternatively be determined in relation to a particular attendee of a meeting. In such cases, obtained engagement data associated with an attendee can be used to determine an engagement metric for that attendee. Any type of engagement data associated with an attendee may be used. For example, in some cases, distraction data, interaction data, emotion data, connection data, and/or influx/outflux data associated with a particular attendee may be used to determine an engagement metric for that attendee.

In some cases, an engagement metric for a particular attendee can be determined as follows:

$$\text{Engagement Metric: } (w_1 * \text{distraction} + w_2 * \text{interaction} + w_3 * \text{emotion} + w_n) / (w_1 + w_2 + w_3 + \ldots + w_n),$$

wherein w is the weight given to the variation variable.

In some embodiments, the engagement data (e.g., distraction data, interaction data, emotion data, connection data, and/or influx/outflux data) associated with an attendee of a meeting is input into a machine learned model or heuristic model that can provide, as output, an engagement metric associated with the attendee. In some cases, the input engagement data may be relevant specifically to the meeting for which engagement is being identified. In other cases, the input engagement data may be relevant to the attendee, but correspond with other meetings the attendee has attended. As can be appreciated, a machined learned model and/or heuristic model may output a value or score indicating an extent of engagement of an attendee or may output a classification (e.g., engaged or disengaged).

In some cases, multiple engagement metrics representing various engagement scores may be generated (e.g., concurrently or serially). As one example, a first engagement metric (e.g., related to distraction data) may be determined and, if the first engagement metric exceeds a threshold (or falls below a threshold), a second engagement metric (e.g., related to interaction data, emotion data, influx/outflux data, and/or connection data) may be determined. Any number or types of engagement data may be used to generate various engagement metrics.

Other types of engagement metrics identified may include terms of interest, attendee activity distribution, connection status, or the like. Terms of interest may include terms or phrases identified as obtaining attention or interest of attendees. Terms of interest may be identified in any number of ways, including use of emotion data throughout the meeting to identify a peak interest in attendees during the meeting. Such a time of peak(s) interest can be used to identify a topic or a discussion during the meeting that occurred at that time. One example of a terms of interest engagement metric 304 is illustrated in FIG. 3. As shown in FIG. 3, the terms of interest that gained more attention or interest are indicated using a larger font, but can be indicated in any number of ways (e.g., sorted in a ranked order).

Attendee activity distribution may indicate different portions of a meeting in association with engagement levels. The various portions of the meeting may be determined in any number of ways. For example, a meeting may be delineated into portions based on time, or topics covered. One example of portions of meetings is illustrated in an attendee activity distribution 306 of FIG. 3. In this attendee activity distribution 306, a meeting is separated into three portions, including lecture, interaction (QnA), and homework review. Further, the engagement levels may be based on any number or type of variables. For example, the engagement levels may be determined based on interaction data, distraction data, and/or the like.

Connection status may indicate connection status associated with various attendees. In this regard, connection status may indicate when attendees joined a meeting or dropped from a meeting. As such, a moderator can be provided with meeting attendance information. Such a connection status may be identified based on connection data. One example of connection status is illustrated in a connection status portion 308 of FIG. 3. As shown in FIG. 3, the connection status may include an indication of attendees as well as a corresponding time the attendee dropped from the meeting.

The engagement metrics can be stored for subsequent use or reference. In this regard, the identified or determined engagement metrics can be stored in the data store 208 for subsequent use to facilitate meeting management and, in particular, management of attendee engagement.

The engagement action controller 226 is generally configured to control or manage actions in association with engagement metrics. In this regard, the engagement action controller 226 may initiate or implement various recommended actions 250, depending on the particular engagement metric and/or configuration of implementation. In embodiments, the engagement action controller 226 can communicate engagement metrics, or data associated therewith, to the moderator device. In this way, a moderator of a meeting, such as a presenter or host of the meeting, can be provided with information related to how engaged attendees are in association with the meeting. As described, the engagement metrics may relate to a set of attendees, such as all attendees, or may be particular to attendees. Accordingly, the engagement action controller 226 may provide engagement metrics for the meeting and/or specific to individuals.

The engagement action controller 226 may provide engagement metrics, and/or information associated therewith, at any time. For instance, engagement metrics may be determined or generated in a periodic manner. In response to generating engagement metrics, the engagement action controller 226 may provide such metrics to the moderator device for display on the moderator device. In other cases, engagement metrics may be generated in a continuous manner or at the end of the meeting. Although generally described herein as providing engagement metrics to the moderator device for display, as can be appreciated, in some embodiments, engagement metrics may additionally or alternatively be provided to attendee devices for display.

The engagement action controller 226 may generate graphical displays to present engagement metrics. For examples, tables, graphs, charts, icons, etc. may be generated to represent engagement metrics. As one example, and as previously described with reference to FIG. 3, a graphical display can be generated that includes an engagement index representing attendee engagement over the duration of the meeting. As another example, a representation of individual attendees' engagement may be generated and/or provided. Individual attendee engagement may be represented in any number of ways. For instance, a list of attendees and corresponding engagement indicators, such as engagement scores or engagement levels (e.g., high, medium, low), may be presented. As another example, an icon, color, text, or other representation may be indicated in association with an attendee indicating the attendee is engaged or disengaged. For instance, assume each attendee is represented by text, icon or video that represents or presents an attendee on the user interface. Each attendee represented via the user interface that is identified as disengaged can be indicated via a colored border, an icon overlay, or the like.

In some cases, an indication as to why the attendee is noted as disengaged may be presented. For example, in cases that an attendee has a poor connection, such an indication can be presented such that the moderator has an understanding as to why the attendee may be disengaged. Further, in some embodiments, the engagement action controller 226 may provide a suggested action to take in relation to the engagement metric. For example, if overall engagement of attendees is low, the engagement action controller 226 may provide a suggestion to pause the presentation and allow for comments or to return to a particular topic at which the level of engagement dropped. As another example, if an individual attendee engagement is indicated as low, the engagement action controller 226 may provide a suggestion to engage the particular attendee (e.g., ask the attendee a question or otherwise draw the attendee into a discussion) or follow-up with the particular attendee following the meeting.

Importantly, and as described herein, the engagement action controller 220 may use the engagement metrics to initiate, request, or prompt resource management. As described, in cases in which an attendee, or set of attendees, is disengaged in a meeting, it may be desirable to reduce resource consumption by disengaging or throttling the video stream and/or audio stream (e.g., in a one-way or a two-way direction).

In one implementation, the engagement action controller 220 may identify when an engagement metric for an individual falls below a threshold (or above a threshold) or when the engagement metric indicates a disengaged attendee. In such a case, the engagement action controller 220 may initiate disconnection or throttling of video and/or audio stream in a one-direction or bi-directional manner. For instance, the engagement action controller 220 may disconnect the video feed of the attendee such that the attendee is not presented via the meeting application (e.g., on the moderator device or other attendee devices) and/or such that the content being presented via a meeting application is not viewable to the attendee. Alternatively or additionally, the engagement action controller 220 may throttle the video feed of the attendee such that a lower video resolution is provided to the attendee. In other cases, the engagement action controller 220 may prompt the moderator via the moderator device and/or the attendee via the attendee device to provide a suggestion (e.g., via a dialog box) to disconnect the audio and/or video feed or to request whether the audio and/or video feed can be disconnected to preserve resources. In some cases, a transcript of the meeting may be automatically generated and provided to the attendee via the attendee device, for example, in cases the audio and/or video feed is disconnected (e.g., in real time or at the conclusion of the meeting).

As can be appreciated, the engagement action controller 220 may similarly identify when an engagement metric for an individual or group rises above a threshold (or falls below a threshold) or when the engagement metric indicates an engaged attendee. In such a case, the engagement action controller 220 may initiate a connection of a video and/or audio stream in a one-direction or bi-direction manner, in cases in which the audio and/or video is disconnected. For instance, the engagement action controller 220 may connect the video feed of the attendee such that the attendee is presented via the meeting application (e.g., on the moderator device or other attendee devices) and/or such that the content being presented is viewable to the attendee. In cases in which audio and/or video streams are throttled, the throttling may be discontinued. In other cases, the engagement action controller 220 may prompt the moderator via the moderator device and/or the attendee via the attendee device to provide a suggestion (e.g., via a dialog box) to connect the audio and/or video feed or to request whether the audio and/or video feed can be connected.

The specific action taken by the engagement action controller 220 may be defined via a default setting or a user selected setting (e.g., via the moderator or attendee). For example, a moderator may indicate or select visualizations and timing for providing visualizations of engagement metrics. As another example, an attendee may indicate or select whether to disconnect the audio and/or video feed in an automated manner or to provide a suggestion in cases that the attendee is identified as disengaged.

Turning to the message manager 230 of FIG. 2, the message manager 230 is generally configured to manage messages input by attendees during meetings. In this regard, the message manager 220 can manage messages input by various attendees via a message or chat portion in association with the meeting application. More specifically, a graphical user interface of a meeting application can include a number of different visual portions, including a message or chat box or area for inputting text messages. In this regard, during a meeting, an attendee may input text in a message portion. The textual input may include comments, questions, links, etc.

As shown in FIG. 2, the message manager 230 may include a message data obtainer 232, a message analyzer 234, and a message action controller 236. According to embodiments, the message manager 230 can include any number of other components not illustrated. In some embodiments, one or more of the illustrated components 232, 234, and 236 can be integrated into a single component or can be divided into a number of different components. Components 232, 234, and 236 can be implemented on any number of machines and can be integrated, as desired, with any number of other functionalities or services.

The message data obtainer 232 can obtain message data 242 associated with a meeting for which automated meeting management is being performed. Message data 242 generally refers to any type of data related to or associated with messages input (e.g., via a message or chat box) by attendees of a meeting. By way of example only, message data includes text input by attendees and metadata associated therewith.

As can be appreciated, message data associated with a meeting can be obtained by message data obtainer 232 in any number of ways. In this regard, message data may be received, retrieved, accessed, referenced, determined, identified, and/or the like. Such message data may be obtained via a data store, such as data store 208. Alternatively or additionally, message data may be obtained from remote services or devices. In some cases, message data is obtained as input, for example, from an attendee device or other device being used (e.g., computing device in meeting room). For example, an application providing an online meeting on an attendee device may be configured to collect various message data and provide the message data to the meeting management engine 206, or a data store associated therewith. The attendee device, or portion thereof (e.g., application), may provide such data on a periodic basis, a continuous basis, or based on an occurrence of an event. Additionally or alternatively, a server (e.g., a server associated with meeting management engine or a server associated with another service) may collect message data and provide such data to the meeting management engine 206, or a data store associated therewith. For instance, message logs may be captured at a remote server, and data therein may be provided to or accessible by the meeting management engine 206. As can be appreciated, in embodiments, the message data obtainer 232 may obtain message data associated with any number of attendees (e.g., all attendees) of a meeting.

Upon obtaining message data (e.g., by obtaining such data from a remote source or attendee devices), the message analyzer 234 can analyze messages to identify message metrics associated with messages. A message metric generally refers to any metric pertaining to a message input by an attendee (e.g., via a chat box). Message input may be any input from an attendee that indicates a message. As one example, a message metric(s) may be associated with similar messages (e.g., questions), such as a number of similar messages, etc.

In this regard, the message analyzer 234 may generate clusters of similar messages. In particular, clusters of similar text content may be identified. Combining or aggregating similar messages reduces the number of similar messages to be viewed, for example by a moderator. As such, a user, such as a moderator, need not scroll through duplicative messages, thereby reducing resource utilization (e.g., by reducing computing resources to process multiple scroll inputs and multiple screen rendering updates).

Identifying clusters of similar messages may be performed in any number of ways. As one example, for each message associated with a meeting, intent of the message (e.g., question) can be identified. For instance, a natural language processing model can be used to identify intent of a message based on lexicons per tenant. In cases that the intent is identified as a new intent, a new entry in a database for that message can be created along with a frequency indication of "1." In cases in which the intent has been previously identified in association with another message of the meeting, the frequency indication of a corresponding entry (e.g., a same or similar intent or question) can be increased by 1. As can be appreciated, the data structure may include entries of different intents, different questions, or the like. The identified clusters can be checked with historical clusters of a same topic and, thus, can be used to auto-reply or refer to relevant materials. A feedback mechanism can help the effectiveness of the auto-generated answers and/or help a moderator to prepare for a next session.

In some embodiments, the message analyzer 234 may generate new or revised messages to facilitate aggregation of similar messages. For instance, assume multiple questions included in a chat box are generally repeated in different manners. In such a case, the message analyzer 234 may use a natural language processing model to facilitate combining similar messages together. By way of example only, assume that during a class lecture Bob asks "how are the chemical bonds formed," Mary asks "how are the bonds forming here," and Neha asks "how is the chemical bond formation happening." In such a case, the message analyzer 234 can identify similarity in the questions and, as such, only one message or question may be provided to the moderator. For example, a moderator may be prompted with one question "How are the chemical bonds formed?" with an indication that the question, or similar question, was asked by three attendees. As can be appreciated, one of the questions may be selected for presentation, or as described above, a new question may be generated by aggregating aspects of multiple questions to form a new question.

The message analyzer 234 can also rank the clusters of similar messages. In some cases, the clusters of similar messages may be ranked by popularity or number of messages in a cluster. For example, a cluster with a highest or greatest number of similar questions can be ranked higher than a cluster with a lower number of similar questions. In other cases, the clusters of similar messages may be ranked by importance, for example, to a meeting topic or to a topic in the meeting covered most recently or for the longest amount of time. As can be appreciated, the clusters of similar messages can be ranked based on any number of factors, and such factors may be default priorities or user selected priorities (e.g., selected by a moderator).

The clusters of similar messages, or data associated therewith (e.g., frequency, rank, message representations, etc.), can be stored for subsequent use. In this regard, the identified or determined clusters of similar messages can be stored in the data store 208 for subsequent use to facilitate meeting management and, in particular, management of input messages.

The message action controller 236 is generally configured to control or manage actions in association with input messages. In this regard, the message action controller 236 may initiate or implement various actions 250, depending on the particular configuration of implementation. In some embodiments, the message action controller 236 can communicate clusters of similar messages, or data associated therewith, to the moderator device. In this way, a moderator of a meeting, such as a presenter or host of the meeting, can be provided with information related to which messages input by attendees are related or similar to one another in association with the meeting.

The message action controller 236 may provide clusters of similar messages, and/or information associated therewith, at any time. For instance, similar messages may be determined or identified in a periodic manner. In response to identifying similar messages, the message action controller 236 may provide such data to the moderator device for display on the moderator device. Although generally described herein as providing clusters of similar messages, or data associated therewith, to the moderator device for display, as can be appreciated, in some embodiments, such information may additionally or alternatively be provided to attendee devices for display.

Figure 4:
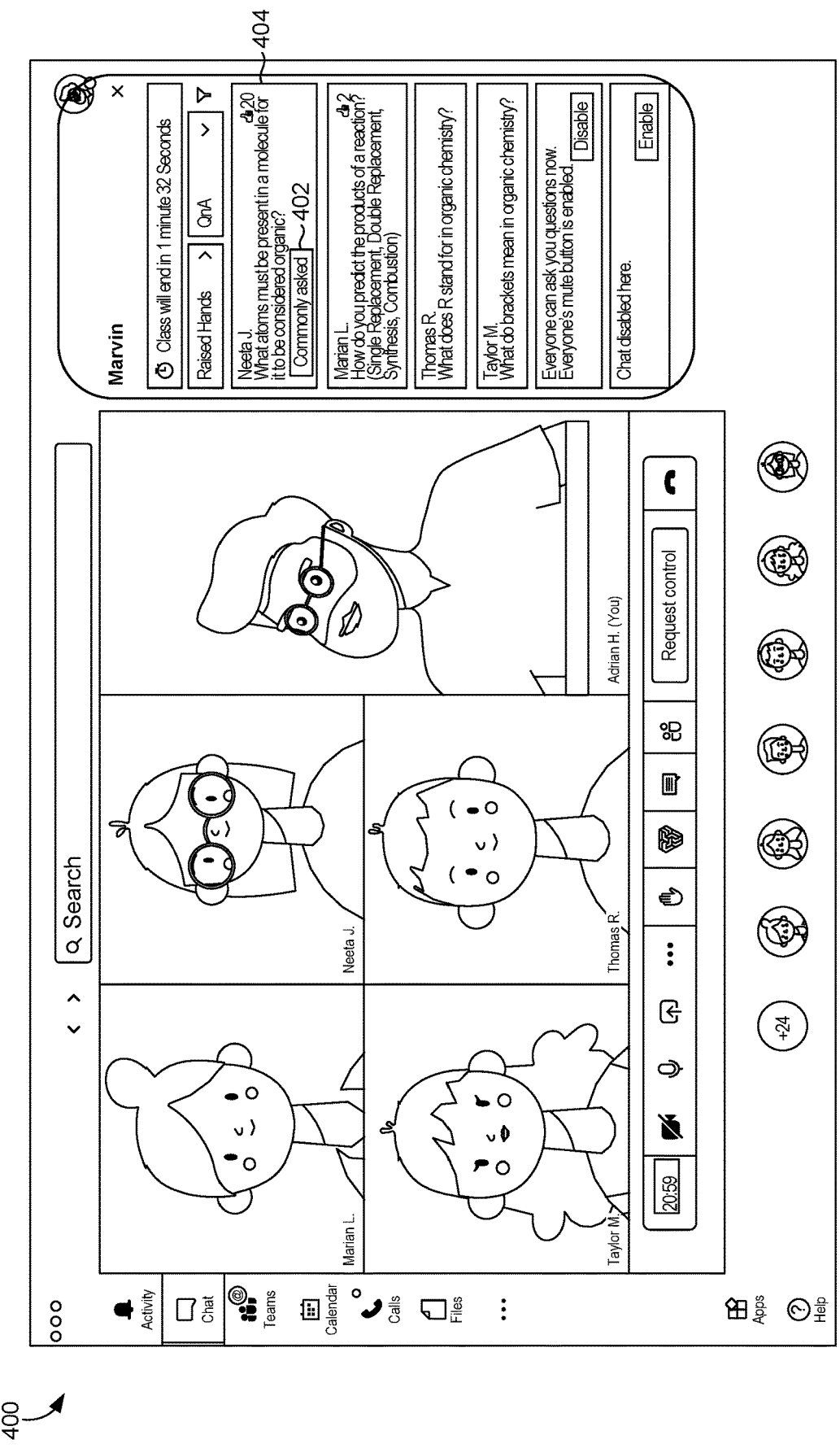
FIG. 4 provides an example graphical user interface for presenting messaging metrics associated with an online meeting, in accordance with aspect of the technology described herein.

As described, the message action controller 236 may provide clusters of similar messages, or data associated therewith, for presentation to a moderator. In this regard, tables, graphs, charts, icons, etc. may be generated to represent message metrics. In some cases, and with reference to FIG. 4, an indication or icon may be provided in association with a message to indicate a common, popular, or frequent question. For example, a "commonly asked" icon 402 may be provided in association with message 404 to illustrate to the moderator that message 404 is commonly or frequently asked. In some cases, a number of similar messages or reactions (e.g., thumbs up) may be included or provided to indicate the extent of popularity of a set of similar messages. As another example, the message action controller 236 may provide the moderator device with a generated message that represents an aggregation of messages.

In embodiments, to determine whether or when to present an indication of message similarity, the message action controller 236 may utilize a message threshold value. A message threshold value can be any threshold that indicates whether to present an indication of message similarity (e.g., a notification of a repetitive message, a frequency of similar messages, etc.). For instance, assume a message threshold is three. In such a case, when three or more messages are identified as similar relative to one another, an indication of message similarity may be provided. For example, the messages may be aggregated and denoted as a common message.

Further, the message action controller 236 can provide messages in a ranked order. For example, messages more frequently repeated (e.g., a cluster of similar questions) can be positioned at the top of a message box while messages less common can be positioned at the bottom of a chat box. As another example, messages most relevant to the current portion of the meeting or relevant to the most lengthy portion of the meeting can be ranked higher and, as such, positioned higher in the message box. As yet another example, the message action controller 236 can provide an automated response based on historical data and ranking. As described, providing similarity indications and ranking similar messages enables a more efficient use of computing resources as a moderator can more efficiently identify messages that are more likely to need addressed by the moderator.

Exemplary Implementations for Facilitating Efficient Meeting Management

As described, various implementations can be used in accordance with embodiments of the present disclosure. FIGS. 5-10 provide example methods illustrating various aspects of efficient meeting management. Such methods may be performed by a meeting management engine, such as meeting management engine 106 of FIG. 1 or meeting management engine 206 of FIG. 2. The flow diagrams represented in FIGS. 5-10 are intended to be exemplary in nature and not limiting.

Figure 5:
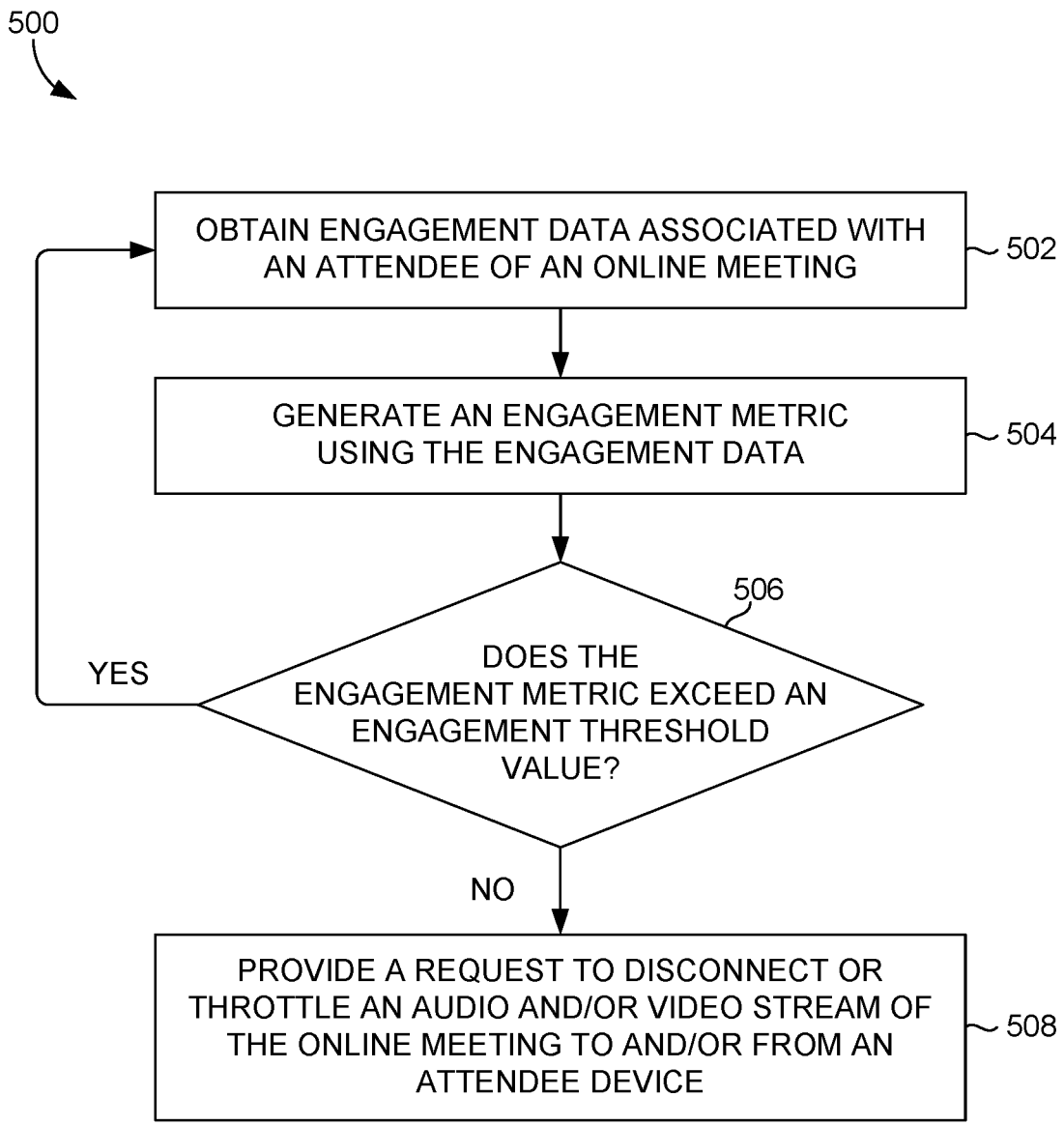
FIG. 5 provides an example method for facilitating online meeting engagement, in accordance with aspects of the technology described herein.

Turning initially to FIG. 5, FIG. 5 provides an example flow diagram to manage engagement associated with an online meeting, in accordance with embodiments described herein. Initially, as illustrated at block 502, engagement data associated with an attendee of an online meeting is obtained. Engagement data may include interaction data, distraction data, emotion data, influx/outflux data, connection data, and/or the like. Such engagement data may be obtained from any number or types of sources. At block 504, an engagement metric is generated using the engagement data. The engagement metric generally indicates an extent of engagement of the attendee to the online meeting. In embodiments, the engagement metric is generated using a machine learned model. For example, engagement data associated with the attendee can be input into a machine learned model and, in response, an indication of engagement can be output. As another example, weights associated with each type of engagement data can be applied to the corresponding types of engagement data to generate an engagement metric. As yet another example, the engagement metric may be generated by generating a first engagement score using a first type of engagement data (e.g., distraction data) and determining the first engagement score indicates a low engagement of the attendee in relation to the first type of engagement data. Thereafter, based on the first engagement score indicating the low engagement of the attendee, a second engagement score is generated using a second type of engagement data associated with the attendee. (e.g., emotion data, interaction data, influx/outflux data, network connection data, etc.).

At block 506, a determination is made as to whether the engagement metric exceeds an engagement threshold value. In cases in which the engagement metric exceeds the engagement threshold value (indicating the attendee is engaged with the meeting), the process returns to block 502 to continue monitoring engagement of the attendee during the online meeting. If, however, the engagement metric falls below the engagement threshold value (indicating the attendee is not engaged with the meeting), at block 508, a request to regulate a media stream of the online meeting associated with the attendee of the online meeting is provided. Such a request may automatically initiate a disconnection or throttling of an audio and/or video of the media stream. In such cases, the request may be provided to the attendee device, a server, or network component to initiate the disconnection or throttling of the audio and/or video stream. In other embodiments, the request may provide a prompt or a notification to the attendee device to request the attendee to initiate a disconnection or to confirm a disconnection or throttling is acceptable to the attendee.

Figure 6:
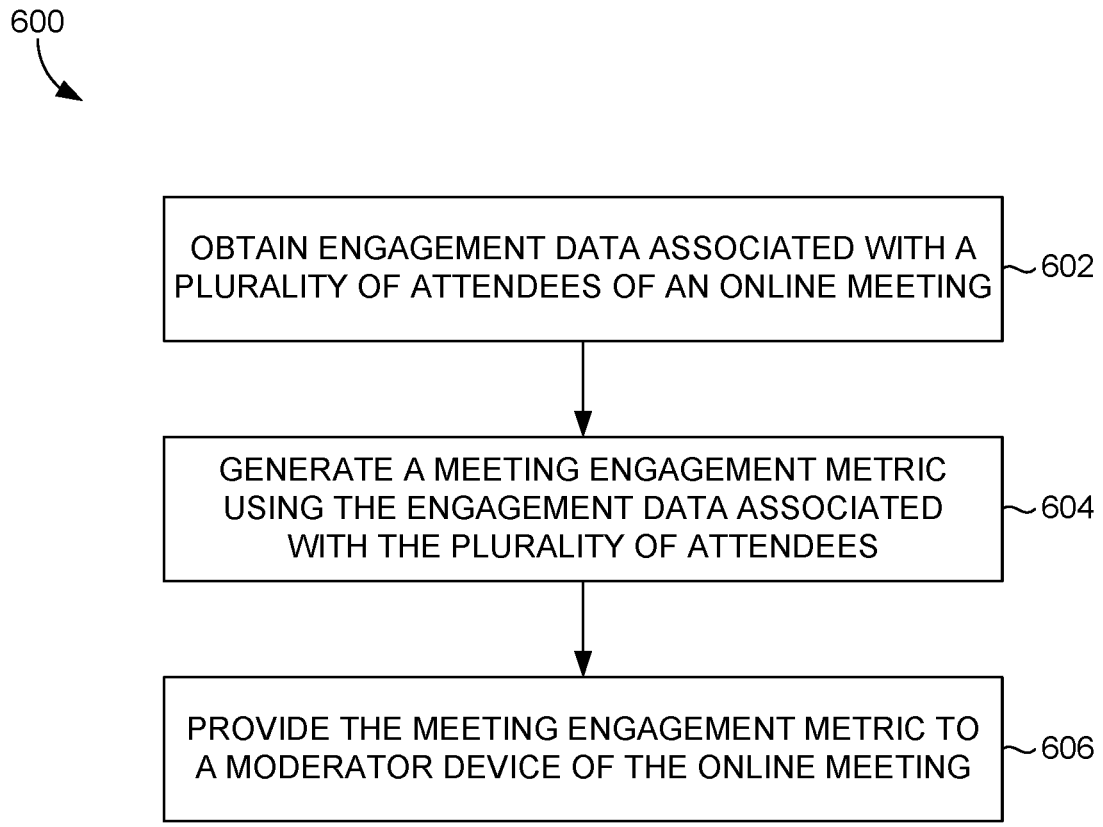
FIG. 6 provides another example method for facilitating online meeting engagement, in accordance with aspects of the technology described herein.

Turning now to FIG. 6, FIG. 6 provides another example flow diagram to manage engagement associated with an online meeting, in accordance with embodiments described herein. Initially, as illustrated at block 602, engagement data associated with a plurality of attendees of an online meeting is obtained. Engagement data may include interaction data, distraction data, emotion data, influx/outflux data, connection data, and/or the like. Such engagement data may be obtained from any number or types of sources. At block 604, a meeting engagement metric is generated using the engagement data associated with the plurality of attendees. The meeting engagement metric generally indicates an extent of engagement of the plurality of attendees to the online meeting. Such a meeting engagement metric can be associated with a particular time, thereby reflecting overall engagement of the attendees at a particular time of the meeting. At block 606, the meeting engagement metric is provided to a moderator device of the online meeting. In embodiments, the meeting engagement metric may be provided during the meeting or at the end of the meeting. In some cases, the meeting engagement metric may be one metric represented in a graphical display including a timeline of the meeting, such that the meeting engagement metric and other meeting engagement metric are graphically represented in association with the timeline to illustrate engagement throughout the timeframe of the meeting. A moderator can then view which points during the meeting are more interesting and less interesting to attendees.

Figure 7:
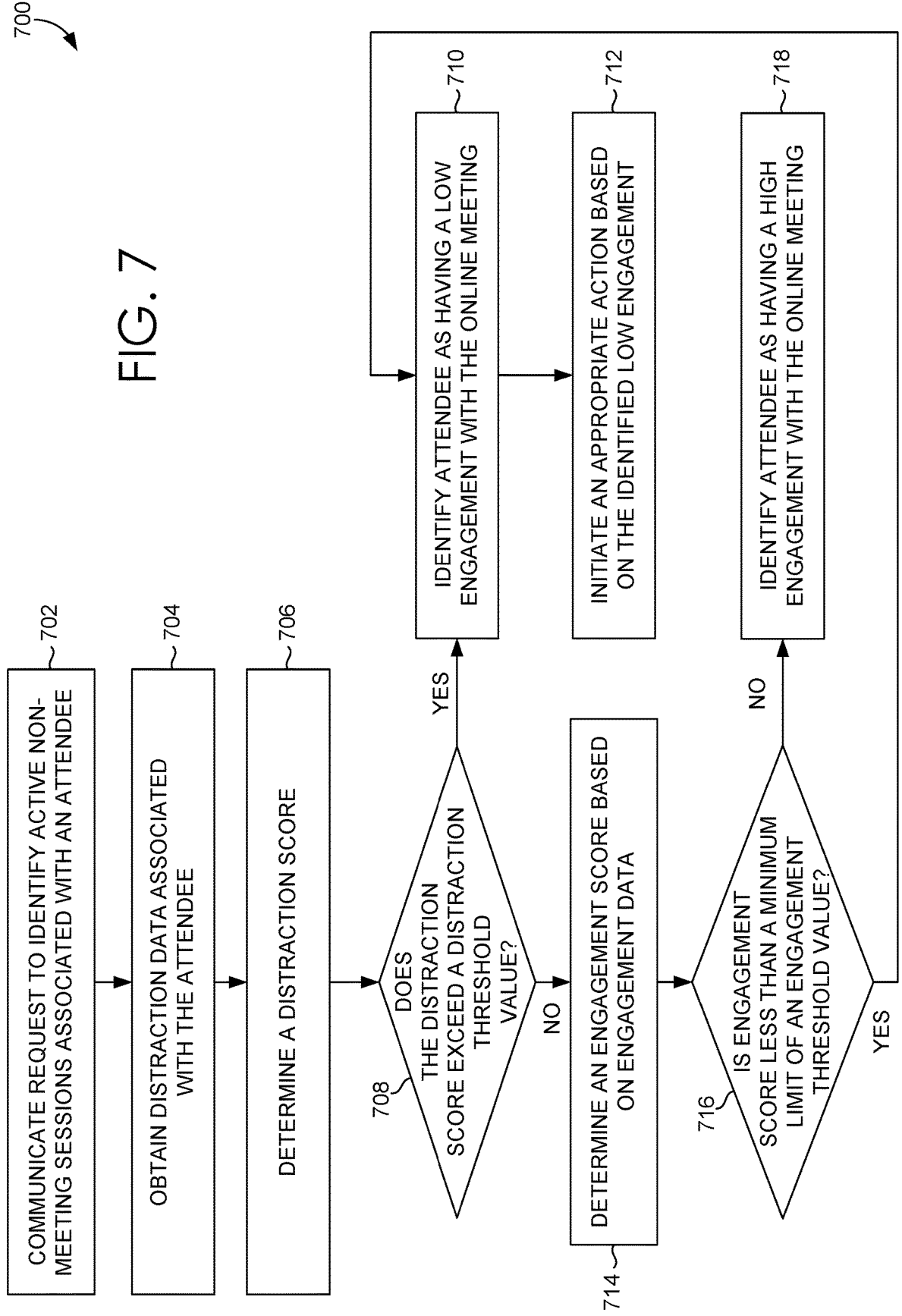
FIG. 7 provides an example method for determining engagement for an attendee of an online meeting, in accordance with aspects of the technology described herein.

With reference now to FIG. 7, FIG. 7 illustrates a method flow for determining an engagement for an attendee of an online meeting, in accordance with embodiments described herein. Initially, at block 702, a request is communicated to identify active non-meeting sessions associated with an attendee. In this regard, computing session data, external to a meeting application hosting an online meeting, in which an attendee is active is identified. In this way, at block 704, distraction data associated with the attendee is obtained. At block 706, a distraction score is determined. Generally, the distraction score may reflect or represent a level of interactivity with non-meeting applications, windows, devices, etc. At block 708, a determination is made as to whether the distraction score exceeds a distraction threshold value. If so, the attendee is generally identified as having a low engagement with the online meeting, as indicated at block 710. Based on a low engagement indicator, an appropriate action is initiated at block 712. Such an action may include modifying video and/or audio in relation to the attendee device, providing a notification to the moderator device, and/or the like.

Returning to block 708, if a determination is made that the distraction score does not exceed a distraction threshold value, an engagement score is determined based on engagement data, as indicated at block 714. In this regard, engagement data, which does not include the distraction data, can be used to determine an engagement score. For example, emotion data, interaction data, connection data, influx/outflux data, and/or the like, can be used to determine an engagement score associated with the user. At block 716, a determination is made as to whether the engagement score is less than a minimum limit of an engagement threshold value. If so, the attendee is generally identified as having a low engagement with the online meeting, as indicated at block 710. Thereafter, based on the low engagement indicator, an appropriate action is initiated at block 712. Such an action may include modifying video and/or audio in relation to the attendee device, providing a notification to the moderator device, and/or the like. On the other hand, if, at block 716, the engagement score is determined to be greater than the minimum limit of the engagement threshold value, the attendee is generally identified as having a high engagement with the online meeting, as shown at block 718. As can be appreciated, in embodiments, an action may be initiated in response to identification of an attendee with a high engagement. For instance, reestablishing a video and/or audio connection may be initiated, or a moderator may be provided with data indicating a high attendee engagement.

Figure 8:
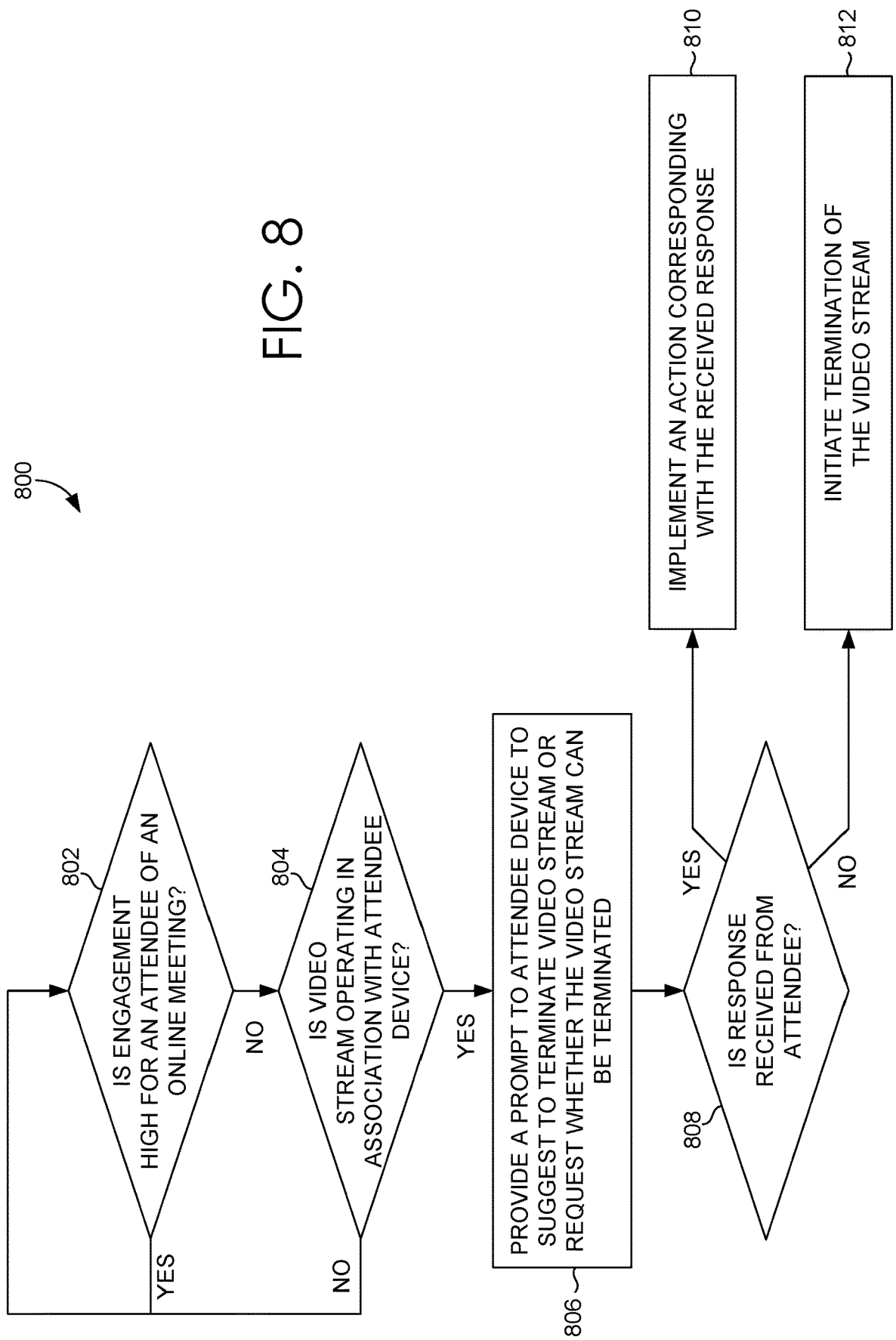
FIG. 8 provides another example method for determining engagement for an attendee of an online meeting, in accordance with aspects of the technology described herein.

Turning to FIG. 8, FIG. 8 illustrates a method flow for managing engagement associated with an attendee of an online meeting, in accordance with embodiments described herein. Initially, at block 802, a determination is made as to whether engagement is high (e.g., exceeds a threshold) for an attendee of an online meeting. If so, the method continues to monitor the attendee's engagement in the online meeting. If not, a determination is made as to whether a video stream is operating in association with the attendee device. This is indicated at block 804. If not, the method continues to monitor the attendee's engagement in the online meeting. On the other hand, if the video stream is operating, a prompt is provided to the attendee device to suggest to the attendee to terminate or disconnect the video stream or to request whether the video stream can be terminated or disconnected, as indicated at block 806. At block 808, a determination is made as to whether a response is received from the attendee. For example, an attendee may be prompted multiple times within a five minute time duration and, if no response, a determination is made that the attendee has not responded. If a response is received, an action corresponding with the received response can be implemented, as indicated at block 810. On the other hand, if no response is received, at block 812, termination of the video stream is automatically initiated. In such a case, a recording of the online meeting can be automatically generated and/or captured for the attendee. As can be appreciated, at various times during the process, engagement scores may be determined. For example, prior to prompting the attendee or prior to automatically initiating disconnection of the video stream, an engagement score may be determined to confirm attendee engagement remains low.

Figure 9:
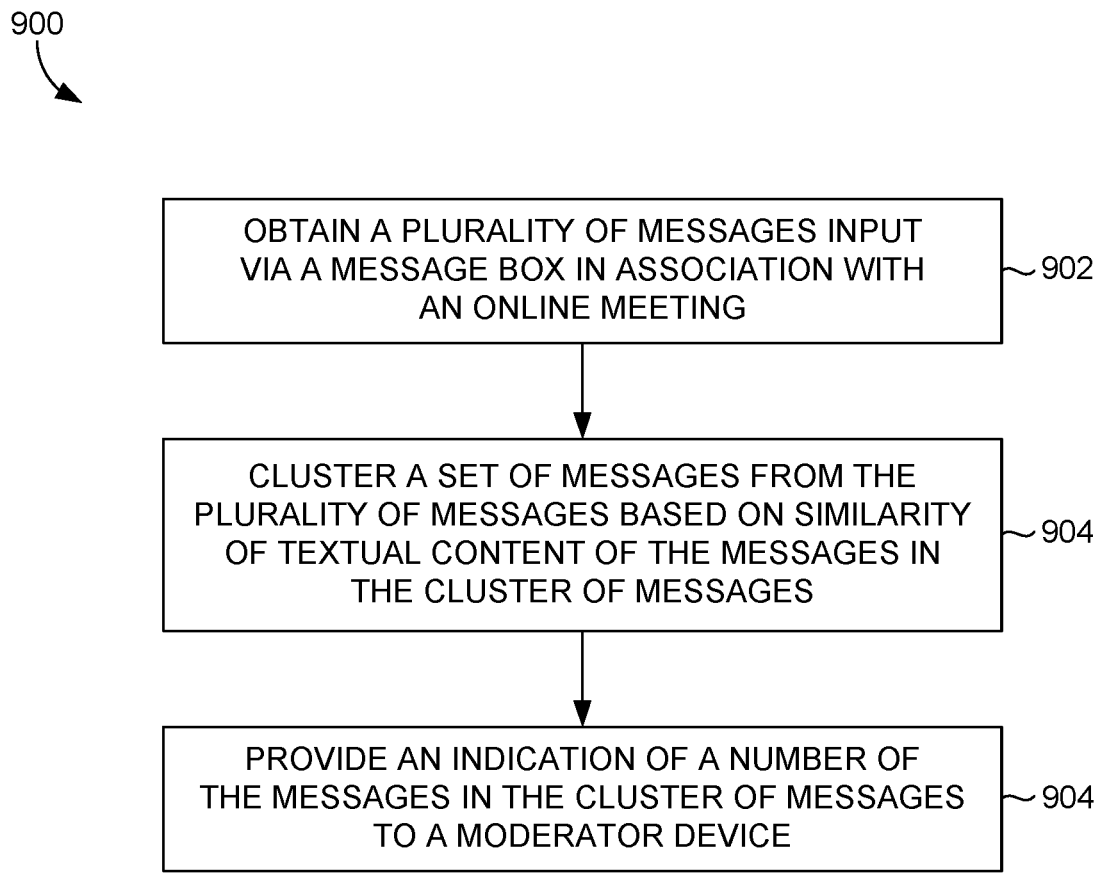
FIG. 9 provides an example method for facilitating efficient meeting management, in accordance with aspects of the technology described herein.

With respect to FIG. 9, FIG. 9 provides a flow diagram related to facilitating efficient meeting management, in accordance with embodiments described herein. Initially, at block 902, a plurality of messages input via a message box in association with an online meeting is obtained. Such messages may be input by multiple attendees of the online meeting. At block 904, a set of messages from the plurality of messages may be clustered together based on similarity of textual content of the messages in the cluster of messages. In implementation, natural language processing may be used to identify intent of the messages and, based on such intent, the messages can be clustered together. At block 906, an indication of a number of the messages in the cluster of messages is provided, for example, to a moderator device. In this regard, the count or frequency of messages that have similar content can be provided to a moderator for efficient review of the messages. In embodiments, the message content of each of the messages in the cluster or one of the messages in the cluster may be provided for concurrent presentation with the indication of the number of messages. In other embodiments, a new message may be generated that represents the cluster of messages and such a new message can be provided for concurrent presentation with the indication of the number of messages.

Figure 10:
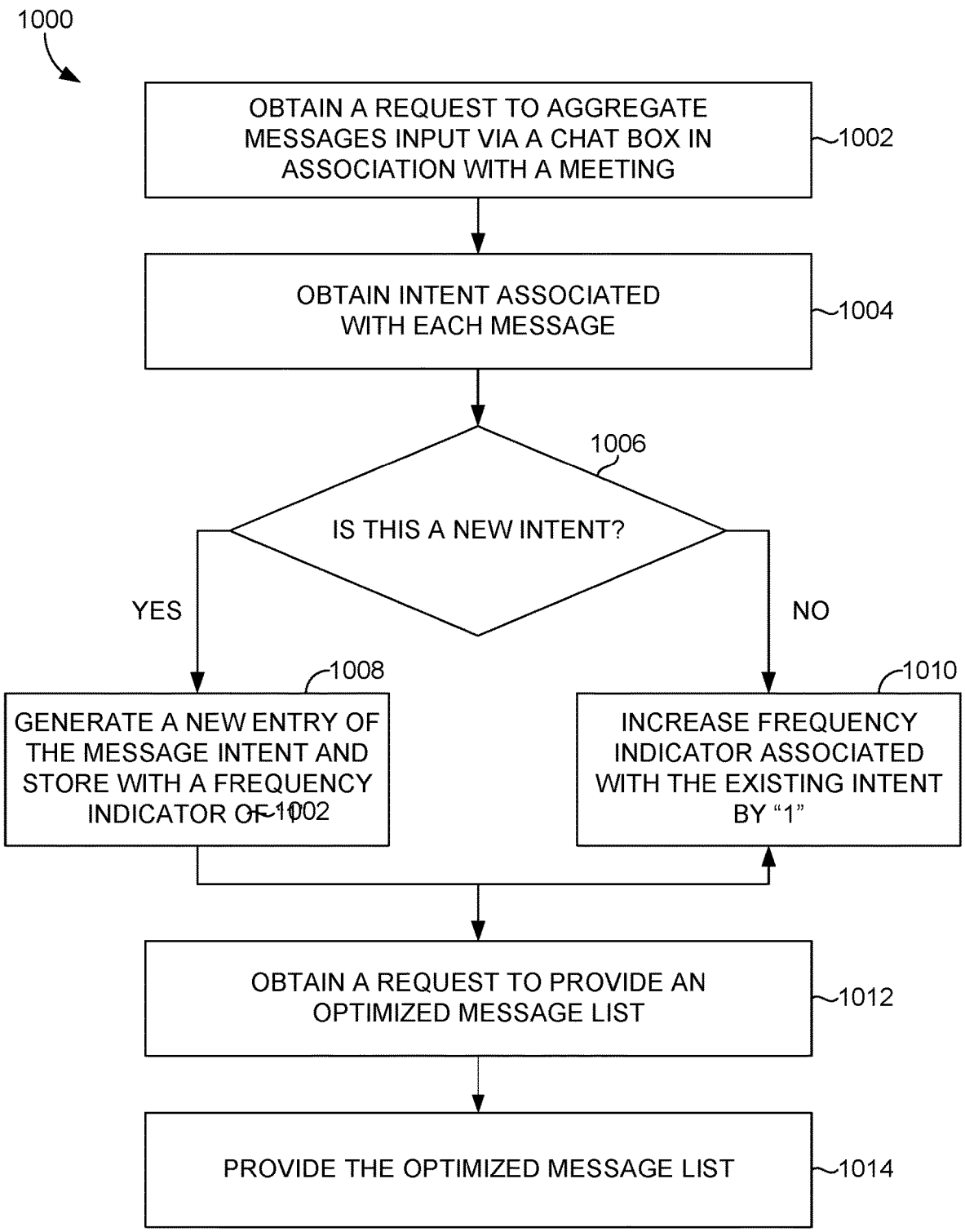
FIG. 10 provides another example method for facilitating efficient meeting management, in accordance with aspects of the technology described herein.

FIG. 10 provides another flow diagram related to facilitating efficient meeting management, in accordance with embodiments described herein. Initially, at block 1002, a request to aggregate messages input via a chat box in association with a meeting is obtained. Such a request may be provided by a moderator device. At block 1004, intent associated with each message is obtained or generated. Thereafter, at block 1006, for each message, a determination is made as to whether the intent is a new intent. If the intent associated with a message is a new intent, a new entry of the message intent is generated and stored with a frequency indicator of "1." This is indicated at block 1008. On the other hand, if the intent associated with the message is not a new intent, a frequency indicator associated with the existing intent is increased by one, as indicated at block 1010. At block 1012, a request to provide an optimized message list is obtained (e.g., provided from a moderator device). As such, at block 1014, the optimized message list is provided. The optimized message list can be in a variety of different forms. For instance, in some cases, the optimized message list may include the frequency indicators for presentation to the moderator. Alternatively or additionally, the messages may be provided in a ranked order, for example based on the frequency indicators.

As described herein, various embodiments may be employed to facilitate efficient meeting management. In some embodiments, a computing system comprising one or more processors; and one or more non-transitory computer-readable storage media, coupled with the one or more processors, having instructions stored thereon, which, when executed by the one or more processors, cause the computing system to perform operations is provided. The operations include obtaining engagement data associated with an attendee of an online meeting. The operations further include generating an engagement metric using the engagement data. The engagement metric indicates an extent of engagement of the attendee to the online meeting. The operations further include, based on the engagement metric indicating that the extent of engagement of the attendee to the online meeting falls below an engagement threshold, providing a request regulate a media stream of the online meeting associated with the attendee of the online meeting. Advantageously, computing and network resources utilization can be reduced when attendees are not engaged with an online meeting.

In any combination of the above embodiments, the engagement data comprises interaction data, distraction data, emotion data, influx/outflux data, and/or connection data.

In any combination of the above embodiments, the engagement metric is generated using a machine learned model. The machine learned model can be iterated regularly with feedback loops deployed in different parts of the system. This machine learned model can also be curated across age groups, domains of meetings, cultural context, or the like.

In any combination of the above embodiments, the engagement metric is generated by weighting each type of engagement data of the engagement data.

In any combination of the above embodiments, the request initiates the regulation of the media stream by disconnecting or throttling of an audio and/or a video of the media stream of the online meeting.

In any combination of the above embodiments, the request provides a recommendation to disconnect or throttle an audio and/or a video of the media stream of the online meeting.

In any combination of the above embodiments, the engagement metric is generated by generating a first engagement score using a first type of engagement data; determining the first engagement score indicates a low engagement of the attendee in relation to the first type of engagement data; based on the first engagement score indicating the low engagement of the attendee, generating a second engagement score using a second type of engagement data associated with the attendee.

In any combination of the above embodiments, the method further includes providing, to a moderator device, a second engagement metric providing an insight related to content, delivery of the content, and/or trainings for an instructor.

In any combination of the above embodiments, the method further includes providing, to a moderator device, an indication of the engagement metric associated with the attendee.

In some embodiments, a computer-implemented method for facilitating efficient meeting management is provided. The method may include obtaining a plurality of messages input via a message box in association with an online meeting. The method further includes generating a cluster of messages from the plurality of messages based on similarity of textual content of the messages in the cluster of messages. The method further includes providing, for graphical display, an indication of a number of the messages in the cluster of messages. Advantageously, by clustering similar messages, computing resources are reduced as the moderator need not scroll through all listed messages.

In any combination of the above embodiments, the indication of the number of the messages comprises the number of messages in the cluster of messages.

In any combination of the above embodiments, the indication of the number of the messages comprises an indication that the number of messages exceeds a threshold value.

In any combination of the above embodiments, the indication of the number of messages comprises a textual indication that the cluster of messages are commonly input by attendees of the online meeting.

In any combination of the above embodiments, the indication of the number of the messages is provided during the online meeting to a moderator device for graphical display to a moderator of the moderator device.

In any combination of the above embodiments, the method further includes generating a new message that represents each of the cluster of messages and providing, for graphical display, the new message to a moderator device.

In any combination of the above embodiments, the method further includes selecting a message of the cluster of messages to represent to the cluster of messages; and providing, for graphical display, the selected message to the moderator device to represent the cluster of messages.

In any combination of the above embodiments, the cluster of messages is ranked among other messages or clusters of messages of the plurality of messages such that the plurality of messages input via the online meeting are presented via a moderator device in a ranked order based on popularity of the plurality of messages.

In some embodiments, one or more computer storage media having computer-executable instructions embodied thereon that, when executed by one or more processors, cause the one or more processors to perform a method for facilitating meeting management is provided. The method includes obtaining engagement data associated with a plurality of attendees of an online meeting. The method further includes generating a meeting engagement metric using the engagement data associated with the plurality of attendees, the meeting engagement metric indicating an extent of engagement of the plurality of attendees to the online meeting. The method further includes providing the meeting engagement metric to a moderator device of the online meeting. Advantageously, a meeting can be managed in an efficient manner.

In any combination of the above embodiments, the meeting engagement metric corresponds with a particular time during the online meeting.

In any combination of the above embodiments, providing, to the moderator device, a plurality of meeting engagement metrics that correspond with a series of times during the online meeting, wherein the plurality of meeting engagement metrics are represented in a graphical display form illustrating engagement of the plurality of attendees to the online meeting over a duration of the online meeting.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 11:
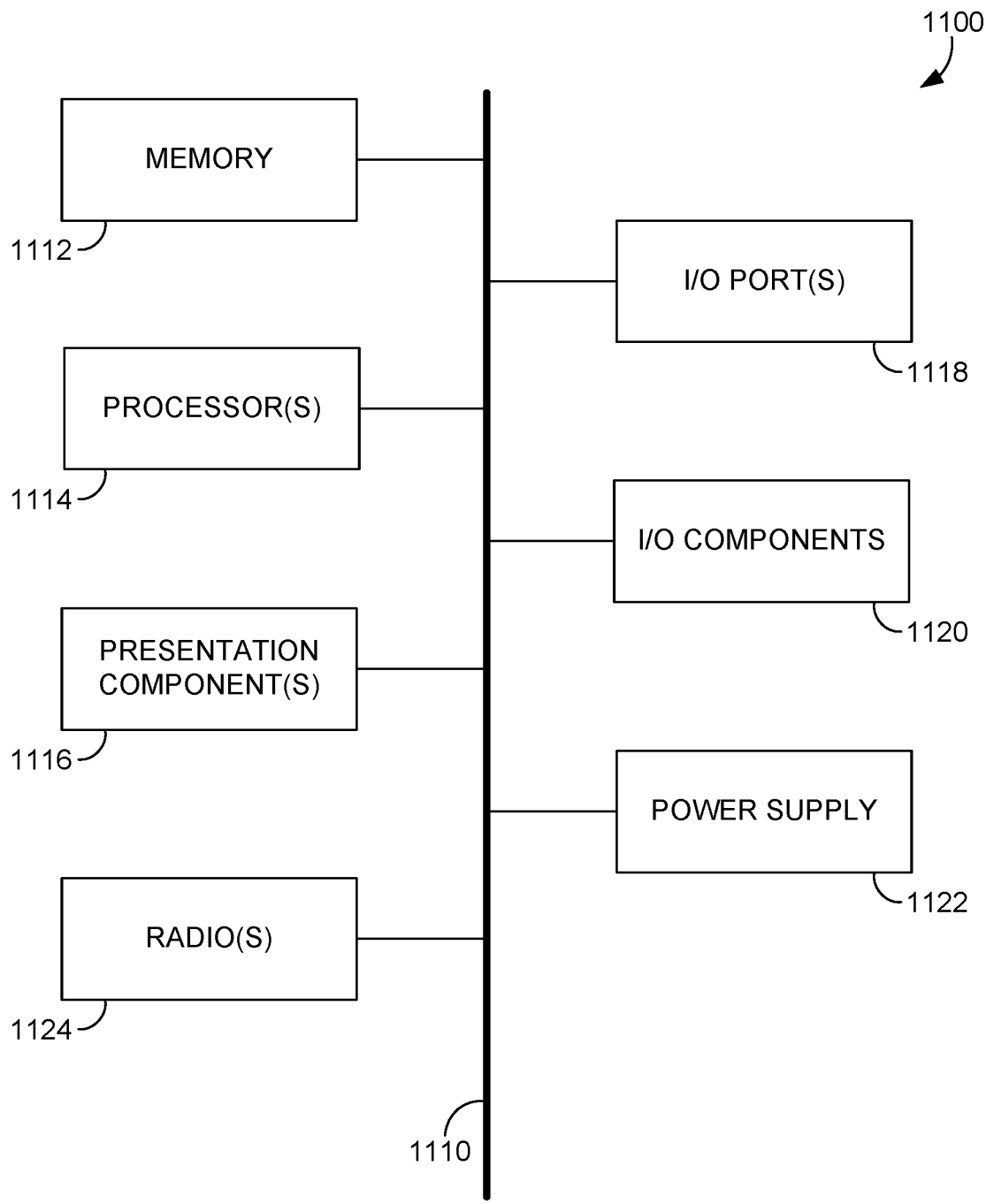
FIG. 11 is a block diagram of an exemplary computing environment suitable for use in implementing aspects of the technology described herein.

Referring to the drawings in general, and initially to FIG. 11 in particular, an exemplary operating environment for implementing aspects of the technology described herein is shown and designated generally as computing device 1100. Computing device 1100 is just one example of a suitable computing environment and is not intended to suggest any limitation as to the scope of use or functionality of the technology described herein. Neither should the computing device 1100 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, an illustrative power supply 1122, and a radio(s) 1124. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 11 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 11 and refer to "computer" or "computing device."

Computing device 1100 typically includes a variety of computer-readable media. Computer-readable media can be any available media that can be accessed by computing device 1100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile and/or nonvolatile memory. The memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112, or I/O components 1120. Presentation component(s) 1116 present data indications to a user or other device. Exemplary presentation components 1116 include a display device, speaker, printing component, vibrating component, etc. I/O port(s) 1118 allow computing device 1100 to be logically coupled to other devices including I/O components 1120, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

A computing device may include radio(s) 1124. The radio 1124 transmits and receives radio communications. The computing device may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
one or more processors; and
one or more non-transitory computer-readable storage media, coupled with the one or more processors, having instructions stored thereon, which, when executed by the one or more processors, cause the computing system to perform operations comprising:
obtaining engagement data associated with an attendee of an online meeting by monitoring data associated with the attendee of the online meeting;
generating, via a machine learned model, an engagement metric using the engagement data, the engagement metric indicating an extent of engagement of the attendee to the online meeting;
obtaining connection data associated with the attendee of the online meeting, the connection data indicating signal strength of a device of the attendee with the online meeting; and
based on the engagement metric indicating that the extent of engagement of the attendee to the online meeting falls below an engagement threshold and the connection data indicating the signal strength of the device of the attendee is above a connection threshold, automatically providing a request to regulate a media stream of the online meeting associated with the attendee of the online meeting, wherein the request initiates the regulation of the media stream by disconnecting or throttling of an audio and/or a video of the media stream of the online meeting.

2. The computing system of claim 1, wherein the engagement data comprises interaction data, distraction data, emotion data, influx/outflux data, and/or additional connection data.

3. The computing system of claim 1, wherein the machine learned model is a heuristic model.

4. The computing system of claim 1, wherein the engagement metric is generated by weighting each type of engagement data of the engagement data.

5. The computing system of claim 1, wherein the request further provides a recommendation to disconnect or throttle the audio and/or the video of the media stream of the online meeting.

6. The computing system of claim 1, wherein the engagement metric is generated by:
generating a first engagement score using a first type of engagement data;
determining the first engagement score indicates a low engagement of the attendee in relation to the first type of engagement data; and
based on the first engagement score indicating the low engagement of the attendee, generating a second engagement score using a second type of engagement data associated with the attendee.

7. The computing system of claim 1, further comprising providing, to a moderator device, a second engagement metric providing an insight related to content, delivery of the content, and/or trainings for an instructor.

8. The computing system of claim 1, further comprising providing, to a moderator device, an indication of the engagement metric associated with the attendee.

9. A computer-implemented method, the method comprising:
obtaining engagement data associated with an attendee of an online meeting by monitoring data associated with the attendee of the online meeting;
generating, via a machine learned model, an engagement metric using the engagement data, the engagement metric indicating an extent of engagement of the attendee to the online meeting;
obtaining connection data associated with the attendee of the online meeting, the connection data indicating signal strength of a device of the attendee with the online meeting; and
based on the engagement metric indicating that the extent of engagement of the attendee to the online meeting falls below an engagement threshold and the connection data indicating the signal strength of the device of the attendee is above a connection threshold, automatically providing a request to regulate a media stream of the online meeting associated with the attendee of the online meeting, wherein the request initiates the regulation of the media stream by disconnecting or throttling of an audio and/or a video of the media stream of the online meeting.

10. The method of claim 9, wherein the engagement metric is generated by weighting each type of engagement data of the engagement data.

11. The computing system of claim 9, wherein the request further provides a recommendation to disconnect or throttle the audio and/or the video of the media stream of the online meeting.

12. The method of claim 9, wherein the engagement metric is generated by:
generating a first engagement score using a first type of engagement data;
determining the first engagement score indicates a low engagement of the attendee in relation to the first type of engagement data; and
based on the first engagement score indicating the low engagement of the attendee, generating a second engagement score using a second type of engagement data associated with the attendee.

13. The method of claim 9, further comprising providing, to a moderator device, a second engagement metric providing an insight related to content, delivery of the content, and/or trainings for an instructor.

14. The method of claim 9, further comprising providing, to a moderator device, an indication of the engagement metric associated with the attendee.

15. One or more computer storage media having computer-executable instructions embodied thereon that, when executed by one or more processors, cause the one or more processors to perform a method for facilitating meeting management, the method comprising:
obtaining engagement data associated with an attendee of an online meeting by monitoring data associated with the attendee of the online meeting;
generating, via a machine learned model, an engagement metric using the engagement data, the engagement metric indicating an extent of engagement of the attendee to the online meeting;
obtaining connection data associated with the attendee of the online meeting, the connection data indicating signal strength of a device of the attendee with the online meeting; and
based on the engagement metric indicating that the extent of engagement of the attendee to the online meeting falls below an engagement threshold and the connection data indicating the signal strength of the device of the attendee is above a connection threshold, automatically providing a request to regulate a media stream of the online meeting associated with the attendee of the online meeting, wherein the request initiates the regulation of the media stream by disconnecting or throttling of an audio and/or a video of the media stream of the online meeting.

16. The media of claim 15, wherein the engagement metric is generated by weighting each type of engagement data of the engagement data.

17. The media of claim 15, wherein the request further provides a recommendation to disconnect or throttle the audio and/or the video of the media stream of the online meeting.

18. The media of claim 15, wherein the engagement metric is generated by:
- generating a first engagement score using a first type of engagement data;
- determining the first engagement score indicates a low engagement of the attendee in relation to the first type of engagement data; and
- based on the first engagement score indicating the low engagement of the attendee, generating a second engagement score using a second type of engagement data associated with the attendee.

19. The media of claim 15, further comprising providing, to a moderator device, a second engagement metric providing an insight related to content, delivery of the content, and/or trainings for an instructor.

20. The media of claim 15, further comprising providing, to a moderator device, an indication of the engagement metric associated with the attendee.

* * * * *